(12) United States Patent
Varela et al.

(10) Patent No.: US 11,888,377 B2
(45) Date of Patent: Jan. 30, 2024

(54) AXLE ASSEMBLY HAVING AN ELECTRIC MOTOR MODULE

(71) Applicant: ArvinMeritor Technology, LLC, Troy, MI (US)

(72) Inventors: Tomaz Varela, Troy, MI (US); Somalingayya G. Math, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 381 days.

(21) Appl. No.: 17/217,055

(22) Filed: Mar. 30, 2021

(65) Prior Publication Data

US 2022/0320946 A1    Oct. 6, 2022

(51) Int. Cl.
*H02K 5/20* (2006.01)
*B60K 1/00* (2006.01)
*H02K 7/00* (2006.01)
*H02K 7/116* (2006.01)
*H02K 9/19* (2006.01)

(52) U.S. Cl.
CPC ............... *H02K 5/203* (2021.01); *B60K 1/00* (2013.01); *H02K 7/006* (2013.01); *H02K 7/116* (2013.01); *H02K 9/19* (2013.01); *B60K 2001/006* (2013.01)

(58) Field of Classification Search
CPC .......... H02K 9/19; H02K 7/006; H02K 7/116; H02K 5/203; B60K 1/00; B60K 7/0007; B60K 11/02; B60K 2001/006; B60K 2007/0061; B60Y 2410/10
USPC .......................................................... 310/54
See application file for complete search history.

(56) References Cited

U.S. PATENT DOCUMENTS

| | | |
|---|---|---|
| 7,364,528 B2 | 4/2008 | Brill et al. |
| 8,794,280 B2 | 8/2014 | Flory et al. |
| 9,278,587 B2 | 3/2016 | Honig |
| 9,283,818 B2 | 3/2016 | Keeney et al. |
| 9,315,077 B2 | 4/2016 | Flory et al. |
| 9,333,813 B2 | 5/2016 | Tiziani et al. |
| 9,428,016 B2 | 8/2016 | Keeney et al. |
| 9,452,644 B2 | 9/2016 | Keeney et al. |
| 9,452,645 B2 | 9/2016 | Polubinski et al. |
| 9,481,213 B2 | 11/2016 | Keeney et al. |
| 9,517,663 B2 | 12/2016 | Lewandowski et al. |
| 9,539,865 B2 | 1/2017 | Lakin et al. |
| 9,597,931 B2 | 3/2017 | Dean et al. |

(Continued)

FOREIGN PATENT DOCUMENTS

| | | |
|---|---|---|
| CN | 203 427 602 U | 2/2014 |
| DE | 10 2017 005462 A1 | 11/2017 |

(Continued)

OTHER PUBLICATIONS

1 Extended European Search Report dated Sep. 19, 2022 for related European Appn No. 22164429.7; 5 Pages.

(Continued)

*Primary Examiner* — Alex W Mok
(74) *Attorney, Agent, or Firm* — Brooks Kushman PC (57) ABSTRACT

An axle assembly having an electric motor module. The electric motor module may include a rotor, a rotor shaft, a stator, a coolant jacket, an end plate, and a motor housing. The motor housing may encircle a portion of the coolant jacket. The end plate may be disposed outside and may not be received in the motor housing.

20 Claims, 8 Drawing Sheets

(56) References Cited

U.S. PATENT DOCUMENTS

| | | |
|---|---|---|
| 9,713,854 B2 | 7/2017 | Zhai et al. |
| 9,809,065 B2 | 11/2017 | Polubinski et al. |
| 9,815,340 B2 | 11/2017 | Trostle et al. |
| 9,919,569 B2 | 3/2018 | Lewandowski et al. |
| 10,035,384 B2 | 7/2018 | Keeney et al. |
| 10,052,923 B2 | 8/2018 | Power et al. |
| 10,391,824 B2 | 8/2019 | Trostle et al. |
| 10,500,940 B2 * | 12/2019 | Garcia ............... F16H 57/037 |
| 10,500,941 B2 * | 12/2019 | Garcia ............... F16H 57/037 |
| 2005/0268464 A1 | 12/2005 | Burjes et al. |
| 2012/0178574 A1 * | 7/2012 | Grochowski ......... B60K 6/405 |
| | | 903/910 |
| 2012/0235462 A1 * | 9/2012 | Yamamoto .......... B60K 17/046 |
| | | 301/6.5 |
| 2014/0041481 A1 | 2/2014 | Pinotti |
| 2015/0096655 A1 | 4/2015 | Koulinitch et al. |
| 2015/0306975 A1 * | 10/2015 | Timan ..................... B60L 7/26 |
| | | 105/49 |
| 2019/0039409 A1 | 2/2019 | Eschenburg et al. |
| 2019/0054816 A1 | 2/2019 | Garcia et al. |
| 2019/0331173 A1 | 10/2019 | Eschenburg et al. |

FOREIGN PATENT DOCUMENTS

| | | | |
|---|---|---|---|
| WO | WO-2019017786 A1 * | 1/2019 | ............. B60K 11/02 |
| WO | 2019217861 A1 | 11/2019 | |
| WO | 2019233329 A1 | 12/2019 | |

OTHER PUBLICATIONS

Ghatti, et al., U.S. Appl. No. 16/594,795, filed with the United States Patent and Trademark Office on Oct. 7, 2019.

Keeney, et al., U.S. Appl. No. 16/901,704, filed with the United States Patent and Trademark Office on Jun. 15, 2020.

\* cited by examiner

AXLE ASSEMBLY HAVING AN ELECTRIC MOTOR MODULE

TECHNICAL FIELD

This disclosure relates to an axle assembly having an electric motor module and a method of assembly.

BACKGROUND

An axle assembly having an electric motor module is disclosed in U.S. Patent Publication No. 2019/0054816.

SUMMARY

In at least one embodiment an axle assembly is provided. The axle assembly may include an electric motor module. The electric motor module may include a rotor, a rotor shaft, a stator, the coolant jacket, an end plate, and a motor housing. The rotor may be rotatable about a rotor axis. The rotor shaft may extend from the rotor and may be rotatable about the rotor axis with the rotor. The stator may encircle the rotor. The coolant jacket may encircle the stator and may have a set of channels that may be open in a direction that faces away from the rotor axis. The end plate may engage and may be fixedly attached to an end of the coolant jacket and may support the rotor shaft. The motor housing may encircle a portion of the coolant jacket. The motor housing may be spaced apart from the end plate. The end plate may not be received inside the motor housing. The coolant jacket may not be received inside the end plate. Multiple members of the set of channels may be received inside the motor housing. The remaining members of the set of channels may not be received inside the motor housing.

In at least one embodiment a method of making an axle assembly is provided. The method may include assembling an electric motor module by inserting a coolant jacket, a stator, a rotor, and a rotor shaft partially inside a motor housing. The stator may encircle the rotor. The coolant jacket may encircle the stator. The coolant jacket may have a set of channels that are arranged around the stator. An end plate may be attached to an end of the coolant jacket that is disposed outside of the motor housing such that the rotor shaft extends through and is supported by the end plate. The electric motor module may then be installed on a transmission housing assembly by inserting a portion of the coolant jacket that is not partially received inside the motor housing into the transmission housing assembly. The motor housing may be fastened to the transmission housing assembly such that the end plate is completely received inside the transmission housing assembly, multiple members of the set of channels are received inside the motor housing, and the remaining members of the set of channels are received inside the transmission housing assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
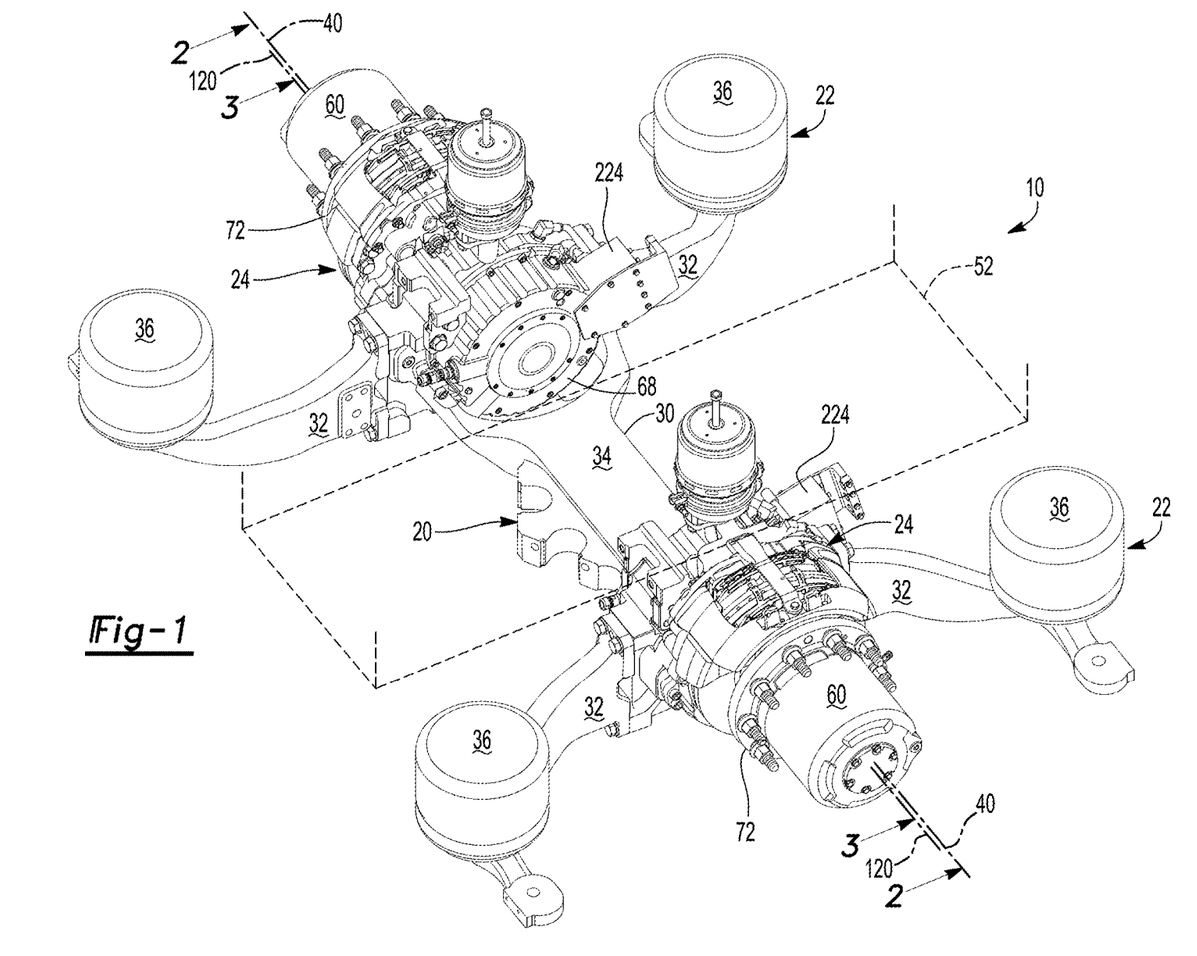
FIG. 1 is a perspective view of an example of a drive axle system.

Referring to FIG. 1, an example of a drive axle system 10 is shown. The drive axle system 10 may be provided with a vehicle like a bus, car, truck, or the like. In at least one configuration, the drive axle system 10 may include a support structure 20, a suspension system 22, and one or more axle assemblies 24.

The support structure 20 may be configured to support a pair of axle assemblies 24. In addition, the support structure 20 may operatively connect the axle assemblies 24 to the suspension system 22. In at least one configuration, the support structure 20 may include a main support 30 and a plurality of arms 32.

The main support 30 may support multiple axle assemblies 24. For example, the main support 30 may extend in a lateral direction or a direction that extends from the left side of the vehicle to the right side of the vehicle. An axle assembly 24 may be disposed proximate each lateral end of the main support 30 (i.e., at opposite ends of the main support 30). In at least one configuration, the main support 30 may extend below each axle assembly 24 may have a generally flat or planar top surface 34.

Figure 2:
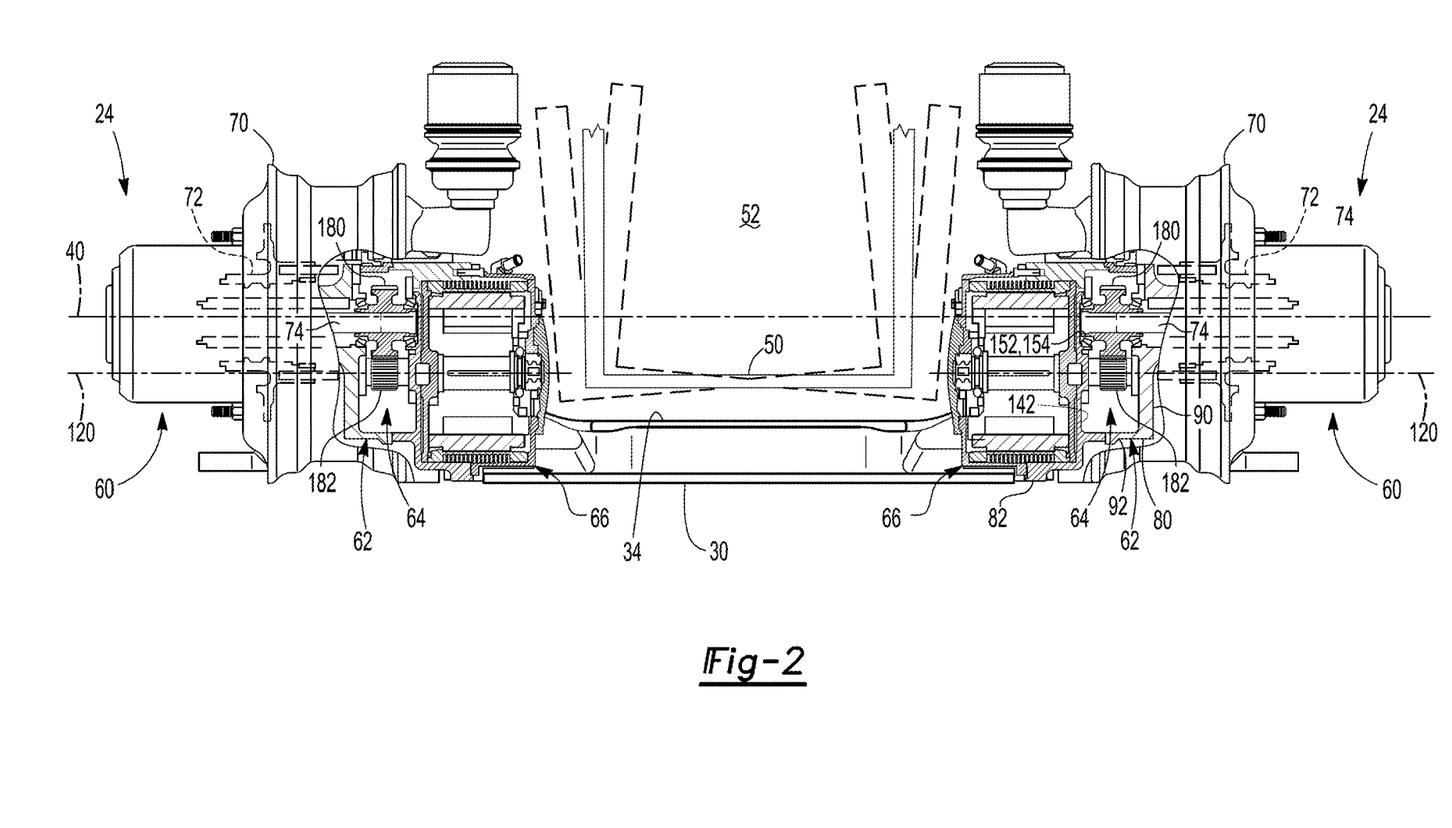
FIG. 2 is a section view of the drive axle system along section line 2-2.

Referring to FIGS. 1 and 2, the top surface 34 may be disposed between the axle assemblies 24 and may be positioned below a wheel axis of rotation or wheel axis 40. Such a configuration may provide a gap between the axle assemblies 24 through which a portion of the vehicle body structure 50 of the vehicle may extend. More specifically, a portion of the vehicle body structure 50 that defines a floor or aisle 52 of the vehicle may be located between the axle assemblies 24, thereby positioning floor or aisle 52 closer to the ground or road upon which the vehicle is disposed. The floor or aisle 52 may extend in a longitudinal direction through the gap and between the axle assemblies 24 such that the bottom of the floor or aisle 52 may be positioned below the top of the axle assemblies 24 and below the wheel axis 40. In a vehicle such as a bus, the aisle 52 may be a passenger aisle. For clarity, the aisle 52 is shown in phantom in FIG. 1 without the vehicle body structure to more clearly show other components of the drive axle system 10.

Referring to FIG. 2, the vehicle body structure 50 that defines the floor or aisle 52 may extend over and may be spaced apart from the top surface 34 to accommodate vehicle body roll or leaning of the vehicle body structure 50 in a lateral direction, such as may occur during cornering of the vehicle. The range of body roll is represented by dashed lines in FIGS. 2-4 and may be any suitable amount, such as ±5°.

Referring to FIG. 1, one or more arms 32 may extend from the main support 30. An arm 32 may be disposed proximate an end of the main support 30 and may generally extend in a longitudinal direction (e.g. forward or backward direction that may be perpendicular to the lateral direction). In the configuration shown, four arms 32 are depicted and are arranged such that a pair of arms 32 are disposed proximate each lateral end of the main support 30. One arm 32 of the pair may extend in a forward vehicle direction while the other arm 32 may extend in a rearward vehicle direction.

The suspension system 22 may connect the support structure 20 with a frame or chassis of the vehicle. In addition, the suspension system 22 may dampen vibrations associated with vehicle travel, provide a desired level of ride quality, help control vehicle ride height, or combinations thereof. The suspension system 22 may have any suitable configuration. For instance, the suspension system 22 may be an independent suspension system that may allow wheels to independently move up and down with respect to each other or without influence from another wheel. Alternatively, the suspension system 22 may not be an independent suspension system. The suspension system 22 may include one or more dampeners 36, such as air springs, shock absorbers, or combinations thereof. In the configuration shown, the dampeners 36 are depicted as air springs and a dampener 36 is disposed proximate a distal end of each arm 32 of the support structure 20. A top side of each air spring may be disposed underneath a chassis of the vehicle and may support the chassis.

Referring to FIGS. 1 and 2, an axle assembly 24 may provide torque to a traction wheel assembly. In at least one configuration and as is best shown in FIG. 2, an axle assembly 24 may include a wheel end assembly 60, a transmission housing assembly 62, a transmission 64, and an electric motor module 66.

The wheel end assembly 60 may be disposed at an outboard end of the axle assembly 24. For example, the wheel end assembly 60 may be disposed at an outboard end of the axle assembly 24 that may face away from the floor or aisle 52 and that may be disposed opposite the electric motor module 66. The wheel end assembly 60 may facilitate mounting of a wheel 70 upon which a tire may be disposed. For instance, the wheel end assembly 60 may include a wheel hub 72 that may be rotatable about the wheel axis 40. The wheel hub 72 may include a plurality of lug bolts that may extend through corresponding holes of a wheel 70 in a manner known by those skilled in the art. Optionally, reduction gearing may be provided with the wheel end assembly 60. For instance, a reduction gearset having bevel gears or a planetary gear set may be provided with the wheel end assembly 60 to provide gear reduction between the transmission 64 and the wheel hub 72. In at least one configuration, the wheel end assembly 60 may include a wheel end shaft 74 that may be operatively connected to the wheel hub 72 and the transmission 64. For instance, torque may be transmitted between the transmission 64 and the wheel end assembly 60 via the wheel end shaft 74.

The transmission housing assembly 62 may support the wheel end assembly 60 and may receive the transmission 64. In addition, the transmission housing assembly 62 may receive a portion of the electric motor module 66 as will be discussed in more detail below. The transmission housing assembly 62 may be axially positioned between the wheel end assembly 60 and the electric motor module 66. In at least one configuration, the transmission housing assembly 62 may include an outboard transmission housing 80 and an inboard transmission housing 82.

Figure 6:
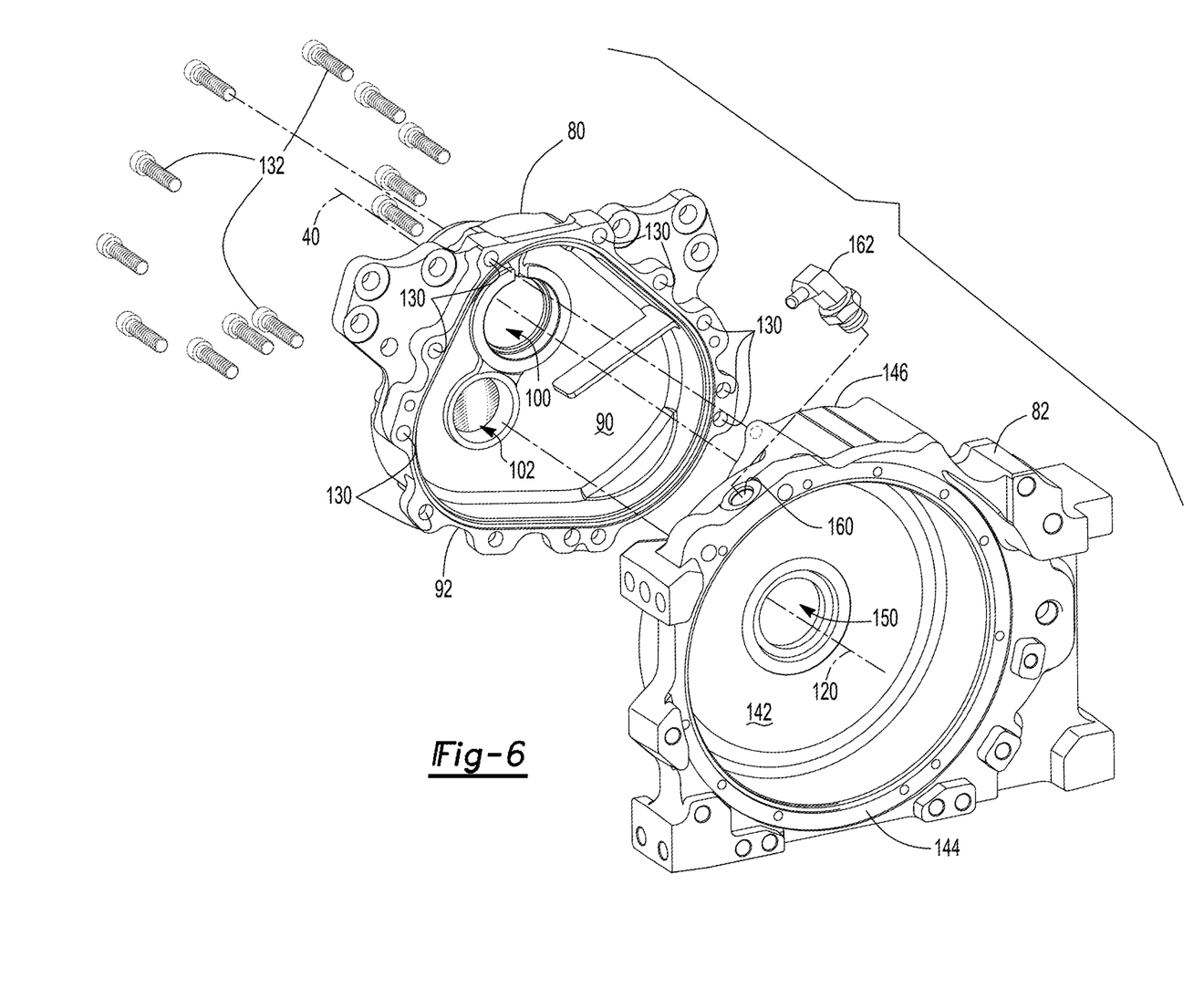
Figure 8:
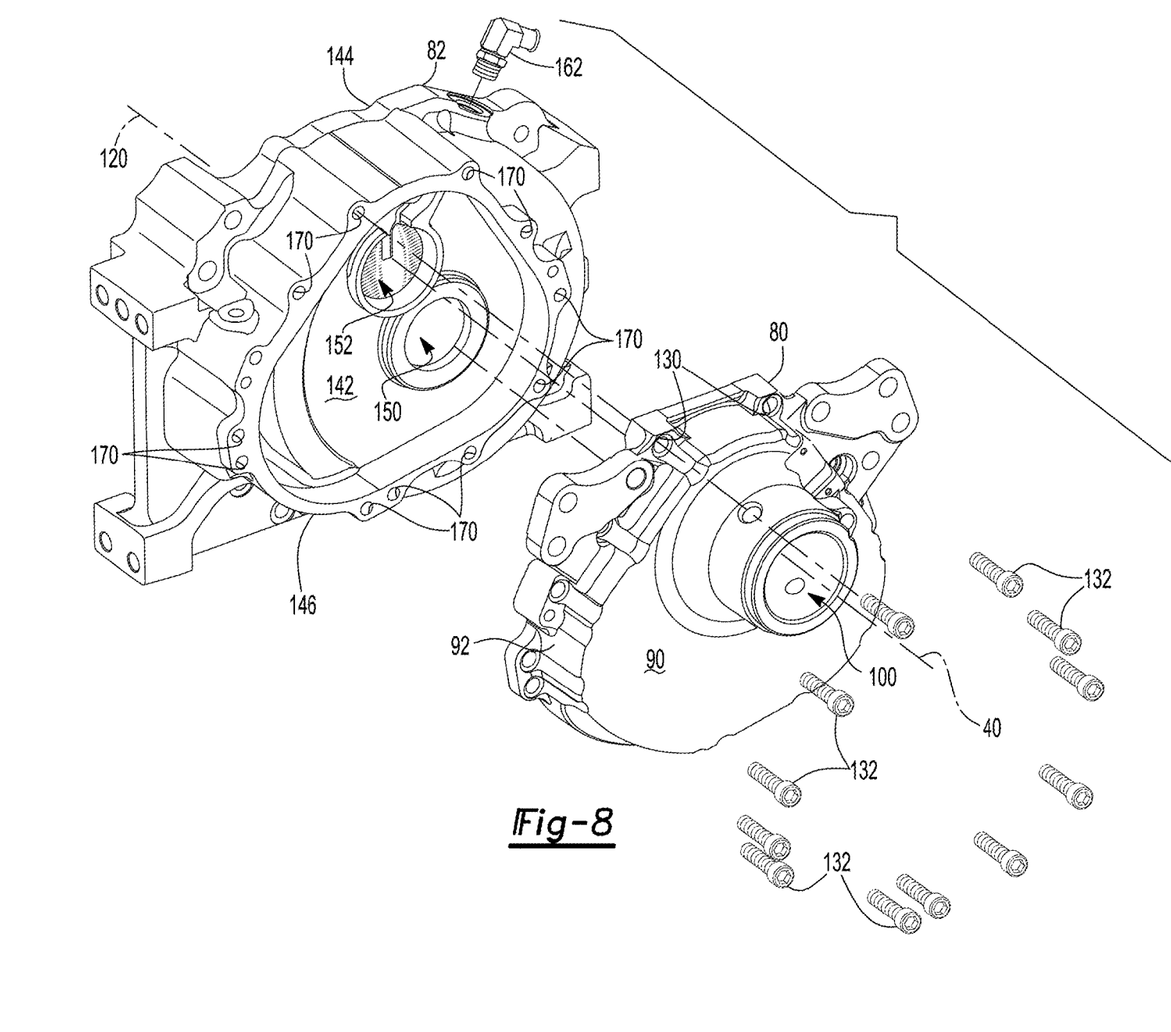

Referring to FIGS. 2, 6, and 8, the outboard transmission housing 80 may support the wheel end assembly 60. For instance, the wheel end assembly 60 may be mounted to the outboard transmission housing 80. The outboard transmission housing 80 may be axially positioned between the wheel end assembly 60 and the inboard transmission housing 82. The outboard transmission housing 80 or a portion thereof may be located inside the wheel 70. In at least one configuration, the outboard transmission housing 80 may include an outboard end wall 90 and a flange wall 92.

The outboard end wall 90 may extend in a generally vertical direction. The outboard end wall 90 may be positioned inside of the wheel 70 and may be spaced apart from the inboard transmission housing 82. The outboard end wall 90 may define an output shaft hole 100 and a bearing pocket 102.

The output shaft hole 100, which is best shown in FIGS. 6 and 8, may be a through hole that may be disposed along and may extend around the wheel axis 40. The wheel end shaft 74 may extend through the output shaft hole 100.

Figure 3:
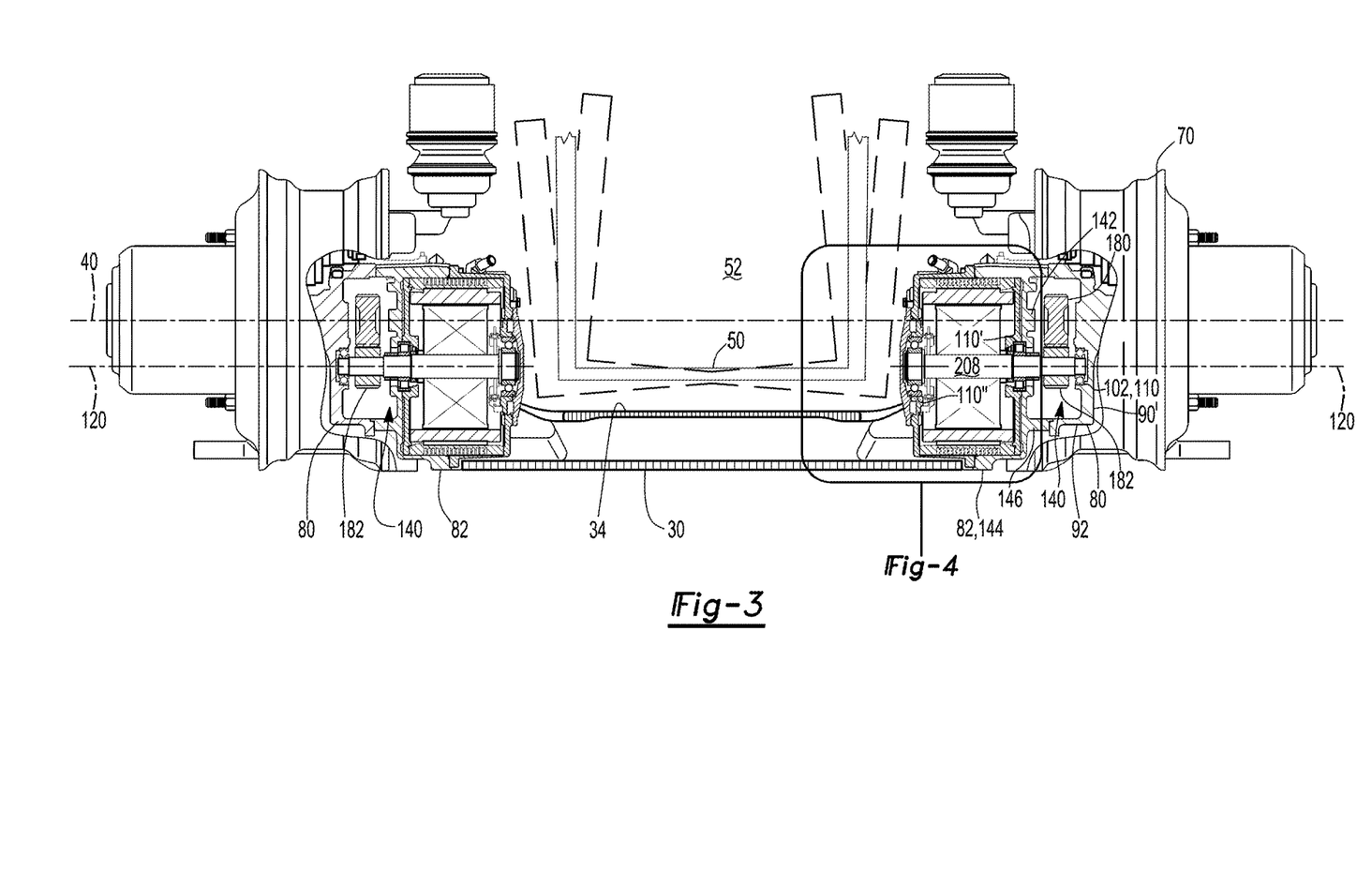
FIG. 3 is a section view of the drive axle system along section line 3-3.

Referring to FIGS. 3 and 6, the bearing pocket 102 may be disposed on a side of the outboard end wall 90 that may face toward the inboard transmission housing 82. The bearing pocket 102 may be configured to receive and support a rotor bearing 110 that may rotatably support a rotor shaft as will be discussed in more detail below. The bearing pocket 102 may be disposed along and may be centered about a rotor axis 120.

Referring to FIGS. 1 and 3, the rotor axis 120 may be disposed parallel or substantially parallel to the wheel axis 40. In at least one configuration, the rotor axis 120 may be positioned below the wheel axis 40 or closer to the ground than the wheel axis 40. In the configuration shown, the wheel axis 40 is not positioned directly above the rotor axis 120; however, it is contemplated that the wheel axis 40 may be disposed directly above the rotor axis 120 in one or more configurations.

Referring to FIGS. 2, 6, and 8, the flange wall 92 may extend from the outboard end wall 90 toward the inboard transmission housing 82. For instance, the flange wall 92 may be configured as a ring that may extend around or encircle the wheel axis 40 and the rotor axis 120 and that may extend from the outboard end wall 90 to the inboard transmission housing 82. As is best shown in FIG. 2, the flange wall 92 or a portion thereof may be received inside the wheel 70. In at least one configuration, a portion of the flange wall 92 may extend generally parallel to the wheel axis 40, the rotor axis 120, or both. As is best shown in FIGS. 6 and 8, the flange wall 92 may include one or more outwardly extending flanges that may facilitate mounting of the outboard transmission housing 80 to the inboard transmission housing 82. For instance, fastener holes 130 may be provided that may receive a corresponding fastener 132 such as a bolt, that may couple the outboard transmission housing 80 to the inboard transmission housing 82. For clarity, only some of the fastener holes 130 and fasteners 132 are labeled in these figures.

Referring to FIGS. 2, 6, and 8, the inboard transmission housing 82 may support the outboard transmission housing 80. For instance, the outboard transmission housing 80 may be mounted to the inboard transmission housing 82. The inboard transmission housing 82 may be axially positioned between the outboard transmission housing 80 and the electric motor module 66. The inboard transmission housing 82 and the outboard transmission housing 80 may cooperate to define a transmission housing cavity 140, which is best shown in FIG. 3, that may receive the transmission 64. In at least one configuration, the inboard transmission housing 82 may include a divider wall 142, a first outer wall 144, and a second outer wall 146.

Figure 4:
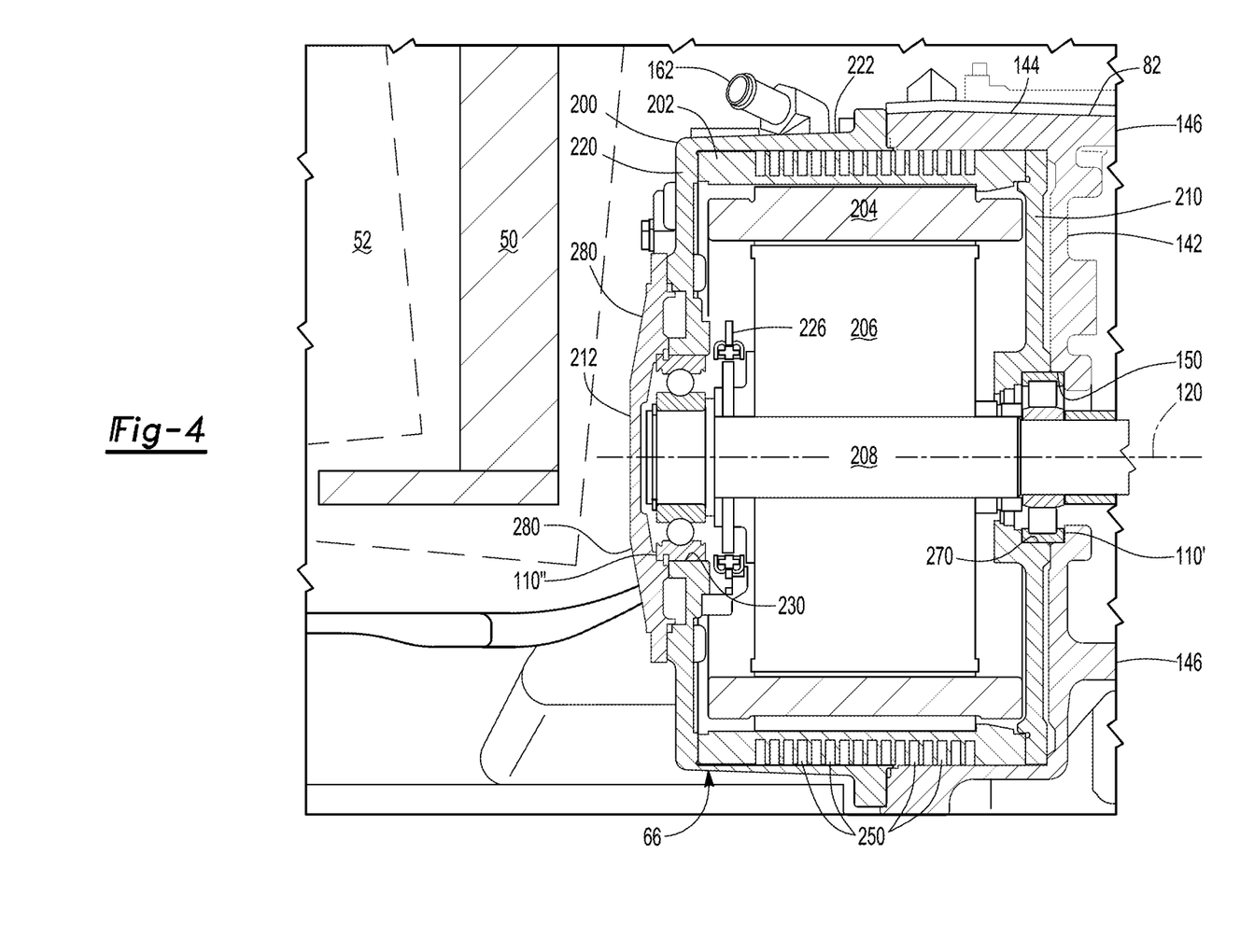
FIG. 4 is a magnified view of a portion of the drive axle system shown in FIG. 3.

Referring to FIG. 2, the divider wall 142 may be positioned between the transmission 64 and the electric motor module 66. In addition, the divider wall 142 may be axially positioned between the first outer wall 144 and the second outer wall 146 as is best shown in FIG. 4. For instance, the divider wall 142 may extend from an end of the first outer wall 144 and an end of the second outer wall 146 inwardly toward the wheel axis 40 and the rotor axis 120. The divider wall 142 may extend in a generally vertical direction. As such, the divider wall 142 or a portion thereof may be disposed substantially parallel to the outboard end wall 90 of the outboard transmission housing 80. The divider wall 142 may be taller or have a greater height than the outboard end wall 90 and may not be received inside the wheel 70 in one or more embodiments. In at least one configuration and as is best shown in FIGS. 6 and 8, the divider wall 142 may define a rotor shaft hole 150 and a bearing pocket 152.

The rotor shaft hole 150 may be a through hole that may be disposed along and may extend around the rotor axis 120. The rotor shaft hole 150 may receive a second rotor bearing 110', which is shown in FIG. 3, that may rotatably support a rotor shaft as will be discussed in more detail below.

Referring to FIGS. 2 and 8, the bearing pocket 152 may be disposed on a side of the divider wall 142 that may face toward the outboard transmission housing 80. For instance, the bearing pocket 152 may extend from a side of the divider wall 142 that may face toward the transmission 64 and away from the electric motor module 66. The bearing pocket 152 may be configured to receive and support a bearing 154 that may directly or indirectly rotatably support the wheel end shaft 74. The bearing pocket 152 may be disposed along and may be centered about the wheel axis 40.

Referring primarily to FIGS. 3, 4, 6, and 8, the first outer wall 144 may extend from the divider wall 142 in a direction that extends toward the electric motor module 66. For instance, the first outer wall 144 may be configured as a ring that may extend around or encircle the wheel axis 40 and the rotor axis 120 and that may extend from the divider wall 142 to the electric motor module 66. In addition, the first outer wall 144 may extend around or encircle multiple components of the electric motor module 66 as will be discussed in more detail below. In at least one configuration and as is best shown in FIG. 6, the first outer wall 144 may define a port 160.

The port 160 may be a through hole that may extend through the first outer wall 144 and that may receive a fitting 162. The port 160 may be fluidly connected to a coolant jacket of the electric motor module 66 as will be discussed in more detail below.

Referring primarily to FIGS. 3, 6, and 8, the second outer wall 146 may extend from the divider wall 142 in a direction that extends toward the outboard transmission housing 80. For instance, the second outer wall 146 may be configured as a ring that may extend around or encircle the wheel axis 40 and the rotor axis 120 and that may extend from the divider wall 142 to the flange wall 92 of the outboard transmission housing 80. The second outer wall 146 may extend around or encircle components of the transmission 64. For instance, the second outer wall 146 may partially encircle gears of the transmission 64 and may be partially received inside the wheel 70. As is best shown in FIG. 8, the second outer wall 146 may have a plurality of fastener holes 170 that may receive corresponding fasteners 132 that may couple the outboard transmission housing 80 to the inboard transmission housing 82. The first outer wall 144 and the second outer wall 146 may extend in the opposite directions from the divider wall 142.

Referring to FIGS. 2 and 3, transmission 64 may transmit torque between the wheel end assembly 60 and the electric motor module 66. The transmission 64 may be received inside the transmission housing cavity 140 of the transmission housing assembly 62. As such, the transmission 64 may be axially positioned between the outboard end wall 90 of the outboard transmission housing 80 and the divider wall 142 of the inboard transmission housing 82 and may be encircled by the flange wall 92 of the outboard transmission housing 80 and the second outer wall 146 of the inboard transmission housing 82. The transmission 64 may include a plurality of gears that may transmit torque between the electric motor module 66 and the wheel end assembly 60. In at least one embodiment, the transmission 64 may include an upper gear 180 and a lower gear 182.

The upper gear 180 may be rotatable about the wheel axis 40 with the wheel end shaft 74. The upper gear 180 may have teeth that may extend away from the wheel axis 40 and that may mate or mesh with teeth of the lower gear 182. The upper gear 180 may be directly or indirectly rotatably supported by the bearing 154 that is received in the bearing pocket 152 of the inboard transmission housing 82.

The lower gear 182 may be rotatable about the rotor axis 120 with the rotor shaft, which will be discussed in more detail below. The lower gear 182 may have a plurality of teeth that may extend away from the rotor axis 120.

Referring to FIGS. 1 and 2, the electric motor module 66 may provide torque to the wheel end assembly 60 to help propel the vehicle. In addition, the electric motor module 66 may receive torque from the wheel end assembly 60 to help recover energy or provide regenerative braking. The electric motor module 66 may be electrically connected to an electrical power source, such as a battery, capacitor, or the like. An inverter may electrically connect the electric motor module 66 and the electrical power source in a manner known by those skilled in the art. The electric motor module 66 may have any suitable configuration. In at least one configuration and as is best shown with reference to FIG. 4, the electric motor module 66 may include a motor housing 200, a coolant jacket 202, a stator 204, a rotor 206, a rotor shaft 208. The electric motor module 66 may also include an end plate 210 and a cover 212.

Figure 5:
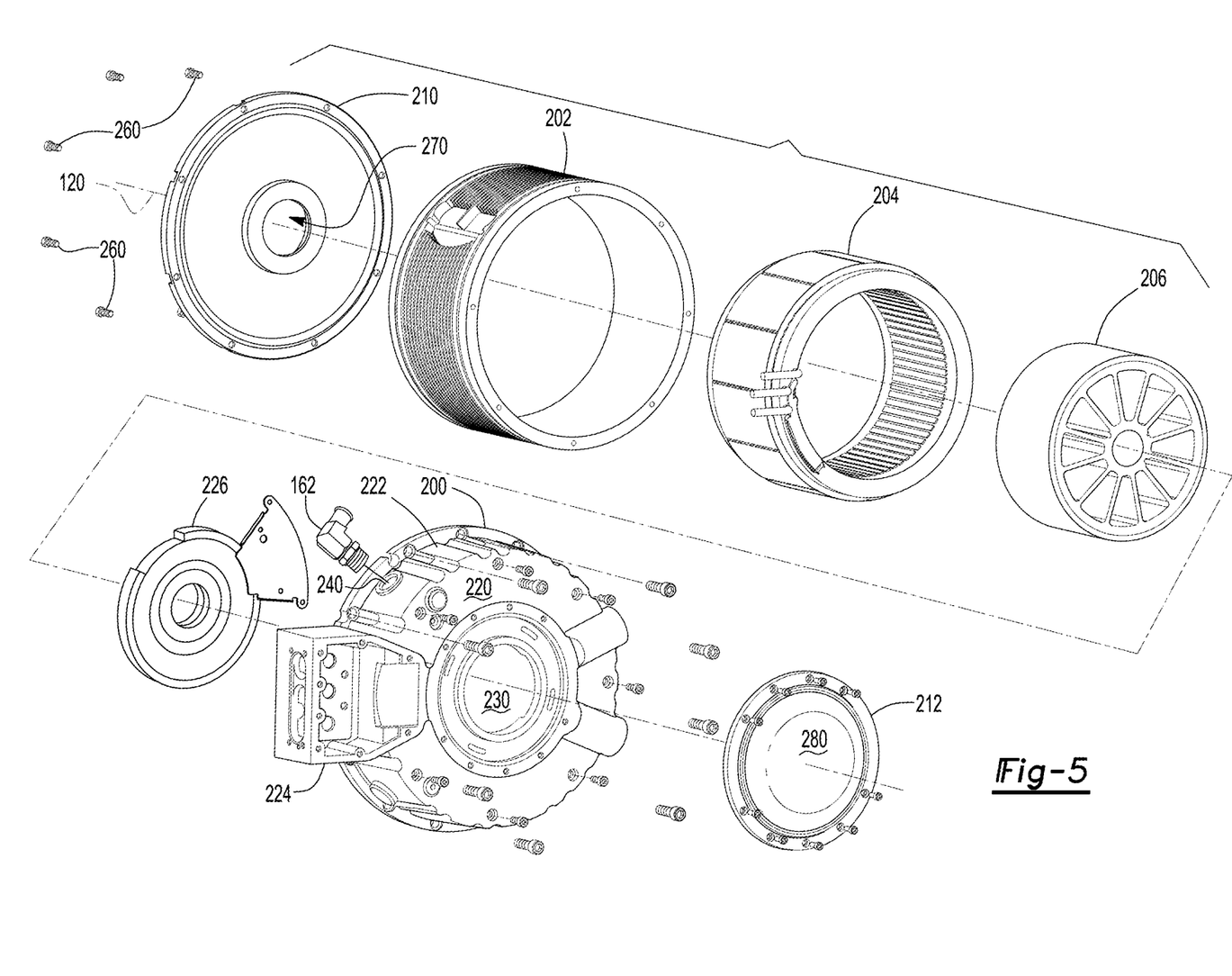
FIGS. 5-8 are exploded views of a portion of the drive axle system.
Figure 7:
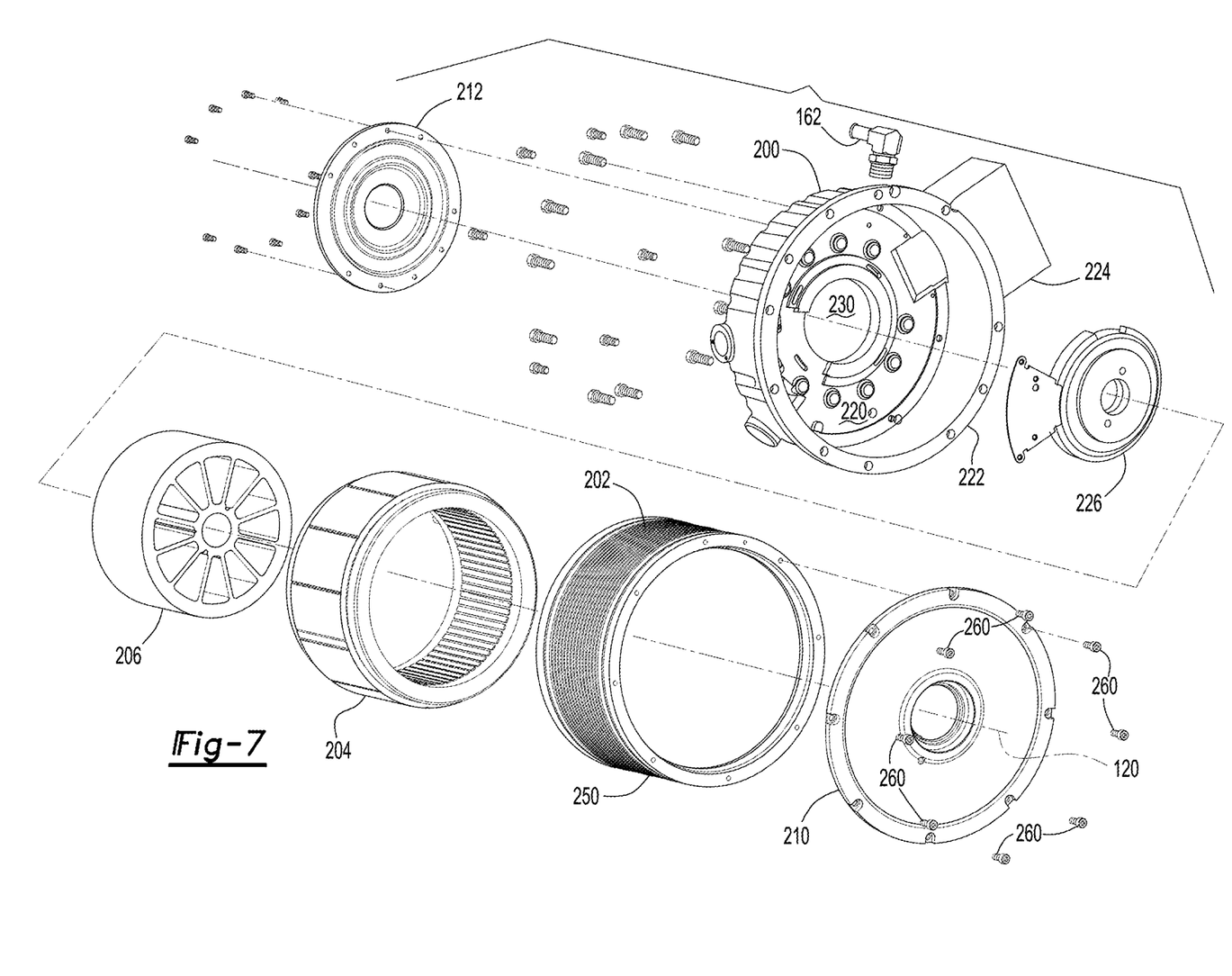

Referring to FIGS. 4, 5, and 7, the motor housing 200 may be disposed at an end of the axle assembly 24 that is opposite the wheel end assembly 60. As such, the motor housing 200 may be axially positioned between the vehicle body structure 50 that defines the floor or aisle 52 and the transmission housing assembly 62. In at least one configuration, the motor housing 200 may include an end wall 220 and an exterior wall 222. The motor housing 200 may also at least partially define a junction box 224.

The end wall 220 may be positioned at an end of the motor housing 200 that may face toward the aisle 52. For example, the end wall 220 may be axially positioned between the cover 212 and components such as the coolant jacket 202, the stator 204, the rotor 206, and the rotor shaft 208. The end wall 220 may extend from an end of the exterior wall 222 toward the rotor axis 120. The end wall 220 may extend in a generally vertical direction. As such, the end wall 220 may be disposed generally parallel to the end plate 210. In at least one configuration, the end wall 220 may define a center hole 230.

The center hole 230 may be a through hole that may be disposed along and may extend around the rotor axis 120. The center hole 230 may receive a rotor bearing 110" that may rotatably support the rotor shaft 208.

The exterior wall 222 may extend from the end wall 220 in a direction that extends toward the transmission housing assembly 62. For instance, the exterior wall 222 may be configured as a ring that may extend around or encircle the wheel axis 40 and the rotor axis 120 and that may extend from the end wall 220 to the first outer wall 144 of the inboard transmission housing 82. As such, an end of the exterior wall 222 may abut an end of the first outer wall 144. In addition, the exterior wall 222 may extend around or encircle a portion of components of the electric motor module 66, such as the coolant jacket 202, the stator 204, and the rotor 206. An interior side of the exterior wall 222 that faces toward the rotor axis 120 may encircle and may engage the coolant jacket 202.

The exterior wall 222 may extend axially or in an axial direction that extends along the rotor axis 120 toward the inboard transmission housing 82 such that the coolant jacket 202, the stator 204, and the rotor 206 are partially received inside the exterior wall 222 and such that the coolant jacket 202, the stator 204, and the rotor 206 protrude in an outboard direction from the end of the exterior wall 222 that engages the end of the first outer wall 144. Conversely, the first outer wall 144 may extend axially or in a direction that extends along the rotor axis 120 toward the exterior wall 222 such that the coolant jacket 202, the stator 204, and the rotor 206 are partially received inside the first outer wall 144. In at least one configuration, exterior wall 222 and the first outer wall 144 may meet near the center of the coolant jacket 202.

In at least one configuration and as is best shown with reference to FIG. 5, the exterior wall 222 may define a port 240.

The port 240 may be a through hole that may extend through the exterior wall 222 and that may receive a fitting 162. The port 240 may be fluidly connected to the coolant jacket 202 as will be discussed in more detail below. The port 240 may be spaced apart from or separated from the port 160 that is provided with the inboard transmission housing 82.

The junction box 224, which may also be called a terminal box, may extend from the end wall 220, the exterior wall 222, or both. The junction box 224 may receive wiring or electrical connectors that may be associated with components such as the stator 204, a resolver 226 that may detect rotation of the rotor 206, or the like. The junction box 224 may have a thin profile and may not protrude axially past the end of the cover 212 to help provide clearance to the vehicle body structure 50.

Referring to FIGS. 4, 5, and 7, the coolant jacket 202 may help cool or remove heat from the stator 204. The coolant jacket 202 may extend around the rotor axis 120 and may not rotate about the rotor axis 120. In addition, the coolant jacket 202 may be fixedly positioned with respect to the motor housing 200. The coolant jacket 202 may be partially received inside the motor housing 200. For instance, a portion of an exterior side of the coolant jacket 202 that faces away from the rotor axis 120 may engage or contact the interior side of the motor housing 200. Moreover, the coolant jacket 202 may be partially received inside the inboard transmission housing 82 when the electric motor module 66 is mounted to the transmission housing assembly 62. For instance, a portion of the exterior side of the coolant jacket 202 may engage or contact an interior side of the first outer wall 144 that may face toward the rotor axis 120. The coolant jacket 202 may extend axially between the end wall 220 of the motor housing 200 and the end plate 210. In at least one configuration, the coolant jacket 202 may include a set of channels 250.

The channels 250 may extend around the rotor axis 120 and may be disposed opposite the stator 204. For example, the channels 250 may extend from the exterior side of the coolant jacket toward the stator 204. The channels 250 may be configured with an open side that may face away from the rotor axis 120 and toward the interior side of the motor housing 200. As such, the channels 250 may be open in a direction that faces away from the rotor axis 120. Coolant may be provided to and removed from the channels 250 via the ports 160, 240. For instance, coolant may enter the channels 250 by the port 240 in the motor housing 200 and may exit the channels 250 by the port 160 in the inboard transmission housing 82 or vice versa. As such, coolant may enter the channels 250 via one port, receive heat from the stator 204 as the coolant flows through the channels 250, and exit the channels 250 via the other port. One or more baffles may be provided with the coolant jacket 202 that may reverse or change the direction of coolant flow to help route coolant between the ports 160, 240. For clarity, only some of the channels 250 are labeled in FIGS. 4, 5, and 7.

Some members of the set of channels 250 may be received inside and may be encircled by the exterior wall 222 of the motor housing 200 while other members of the set of channels 250 may be received inside and may be encircled by the first outer wall 144 of the inboard transmission housing 82. For instance, some, but not all of the members of the set of channels 250 may be received inside and may be encircled by the exterior wall 222 while the remaining members of the set of channels 250 may be received inside and may be encircled by the first outer wall 144. Channels 250 that are encircled by the exterior wall 222 may not be encircled by the first outer wall 144. Conversely, channels 250 that are encircled by the first outer wall 144 may not be encircled by the exterior wall 222.

Referring to FIGS. 4, 5, and 7, the stator 204 may be received inside the coolant jacket 202. In addition, the stator 204 may be fixedly positioned with respect to the coolant jacket 202. As such, the stator 204 may be fixedly positioned with respect to the motor housing 200. The stator 204 may extend around the rotor axis 120 and may not rotate about the rotor axis 120. In addition, the stator 204 may have a similar axial length as the coolant jacket 202. The stator 204 may include stator windings that may be received inside and may be fixedly positioned with respect to the coolant jacket 202. The windings may be electrically connected to the electrical power source. The stator 204 may encircle the rotor 206.

The rotor 206 may be received inside the coolant jacket 202 and the stator 204. In addition, the rotor 206 may extend around and may be rotatable about the rotor axis 120. The rotor 206 may be rotatable about the rotor axis 120 with respect to the stator 204. The rotor 206 may be spaced apart from the stator 204 but may be disposed in close proximity to the stator 204. The rotor 206 may include magnets or ferromagnetic material that may facilitate the generation of electrical current or may be induction-based. The rotor 206 may extend around and may be supported by the rotor shaft 208.

The rotor shaft 208 may be fixedly mounted to the rotor 206. As such, the rotor 206 and the rotor shaft 208 may be rotatable together about the rotor axis 120 and may not rotate with respect to each other. In at least one configuration, the rotor shaft 208 may be received inside the rotor 206. The rotor shaft 208 may extend along the rotor axis 120 or around the rotor axis 120 and may have a one piece construction or a multi-piece construction. The rotor shaft 208 may operatively connect the rotor 206 to the transmission 64.

Referring to FIGS. 4, 5, and 7, the end plate 210 may be positioned at an end of the electric motor module 66 that is disposed outside of the motor housing 200 and that faces toward the divider wall 142 of the inboard transmission housing 82. As such, the end plate 210 may be separated from or spaced apart from the motor housing 200. The end plate 210 may be positioned adjacent to the divider wall 142 and may be axially positioned between the divider wall 142 and components of the electric motor module 66 like the coolant jacket 202, stator 204, and the rotor 206. The end plate 210 may be secured to the coolant jacket 202 in any suitable manner. For instance, the end plate 210 may be attached to an end of the coolant jacket 202 that is disposed outside of the motor housing 200 with a plurality of fasteners 260 such as bolts. As such, the end plate 210 may engage the coolant jacket 202 and may not rotate about the rotor axis 120. In at least one configuration, the end plate 210 may be configured as a generally circular disk that may be received inside of the first outer wall 144 of the inboard transmission housing 82. As such, the end plate 210 may have a smaller diameter than the first outer wall 144. The end plate 210 may define a center hole 270.

The center hole 270 may be a through hole that may be disposed along and may extend around the rotor axis 120. The center hole 270 may receive the rotor bearing 110'. For instance, the rotor bearing 110' may be partially received inside the rotor shaft hole 150 of the divider wall 142 and may be partially received inside the center hole 270. The center hole 270 may be partially defined by a portion of the end plate 210 that may extend axially toward the rotor 206 or to the left from the perspective shown in FIG. 4. As such, a portion of the end plate 210 may be received inside the coolant jacket 202.

Referring to FIGS. 2-4, rotor shaft 208 may be supported by the transmission housing assembly 62, the motor housing 200, the end plate 210, or combinations thereof. For instance, the rotor shaft 208 may be supported by the rotor bearing 110 that is disposed on the outboard transmission housing 80, the rotor bearing 110' that may be supported by the divider wall 142 and the end plate 210, and the rotor bearing 110" that may be supported by the end wall 220 of the motor housing 200. The rotor shaft 208 may be received inside each rotor bearing 110, 110', 110". The rotor bearings 110, 110', 110" may be spaced apart from each other and may be arranged such that the rotor bearing 110 is disposed at a first end of the rotor shaft 208, the rotor bearing 110" is disposed at an opposite end of the rotor shaft 208, and the rotor bearing 110' is positioned along the rotor axis 120 between the other two rotor bearings 110, 110" such that the rotor shaft 208 extends through the rotor bearing 110' as well as the rotor shaft hole 150 of the inboard transmission housing 82 and the center hole 270 of the end plate 210.

Referring to FIGS. 4 and 5, the cover 212 may extend over and may cover or conceal the center hole 230 in the end wall 220. For instance, the cover 212 may be mounted to a side of the end wall 220 that faces toward the body structure that defines the floor or aisle 52. The rotor shaft 208 may protrude through the center hole 230 such that the rotor shaft 208 is partially received inside the cover 212. In at least one configuration, the cover 212 may have a tapered portion 280.

Referring primarily to FIG. 4, the tapered portion 280 may extend around or may encircle the rotor axis 120. The tapered portion 280 may be tapered away from the rotor axis 120 such that the tapered portion 280 becomes progressively closer to the end wall 220 as the distance from the rotor axis 120 increases. Tapering in this manner may help provide body roll clearance between the electric motor module 66 and the vehicle body structure 50 that defines the floor or aisle 52.

An electric motor module 66 as described above may allow an electric motor to be preassembled, adjusted, and tested prior to installation or assembly with the remainder of the axle assembly 24. For instance, the coolant jacket 202 and the stator 204 may be secured to each other and may be inserted into and secured to the motor housing 200 such that the coolant jacket 202 and the stator 204 protrude out of the motor housing 200. The resolver 226, rotor 206 and rotor shaft 208 may be inserted into the cavity defined by the stator 204 and may be supported by the rotor bearing 110" that may be received in the center hole 230 of the end wall 220. Then, the end plate 210 may be fastened to the end of the coolant jacket 202 that protrudes out of the motor housing 200 such that the rotor shaft 208 may be supported by the rotor bearing 110' that may be received in the center hole 270 of the end plate 210.

An axle assembly as described above may help position an aisle of a vehicle closer to the ground by positioning the wheel axis above the rotor axis, which may be desirable on a vehicle such as a low floor bus. In addition, an axle assembly as described above may help increase the width of the aisle by reducing the axial length of the axle assembly, which may increase the lateral distance available between axle assemblies that are disposed on a common support structure. Providing an electric motor module that is only partially received inside of another housing, such as the inboard transmission housing, may help reduce cost and weight and help increase the available package space as compared to providing an electric motor that has components (such as the coolant jacket, stator, and rotor) that are completely enclosed inside of a motor housing. Moreover, an enclosed motor that is received inside of another housing assembly may reduce or limit the size or diameter of the electric motor that may be provided, which in turn may reduce or limit the performance of the electric motor. Providing electric motor module that is only partially received inside of another housing may improve accessibility to internal components for servicing and may simplify assembly and help reduce associated costs. Partially enclosing the coolant jacket in different housings such that the coolant jacket and its channels are not entirely received inside one housing may help reduce the width and weight of the transmission housing and may make it easier to position and package the junction box in a manner that does not reduce or interfere with the width of the aisle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:
1. An axle assembly comprising:
   an electric motor module that includes:
      a rotor that is rotatable about a rotor axis;
      a rotor shaft that extends from the rotor and is rotatable about the rotor axis with the rotor;
      a stator that encircles the rotor;

a coolant jacket that encircles the stator and that has a set of channels that are open in a direction that faces away from the rotor axis;

an end plate that engages and is fixedly attached to an end of the coolant jacket and that supports the rotor shaft; and a motor housing that encircles a portion of the coolant jacket, wherein the motor housing is spaced apart from the end plate, the end plate is not received inside the motor housing, and the end plate does not encircle the coolant jacket;

wherein multiple members of the set of channels are received inside the motor housing and the remaining members of the set of channels are not received inside the motor housing.

2. The axle assembly of claim 1 wherein the motor housing includes an exterior wall that encircles and engages the coolant jacket and an end wall that extends from an end of the exterior wall toward the rotor axis, the end wall defining a center hole that extends around the rotor axis, wherein the rotor shaft is rotatably supported by a first rotor bearing that is received inside the center hole of the end wall.

3. The axle assembly of claim 2 wherein a cover is mounted to the end wall of the motor housing and extends over and encloses the center hole of the end wall.

4. The axle assembly of claim 3 wherein the rotor shaft protrudes through the center hole of the end wall such that the rotor shaft is partially received inside the cover.

5. The axle assembly of claim 3 wherein the cover has a tapered portion that encircles the rotor axis and is tapered away from the rotor axis such that the tapered portion becomes progressively closer to the end wall as a distance from the rotor axis increases to provide body roll clearance to a vehicle body structure that defines an aisle.

6. The axle assembly of claim 1 further comprising:

a wheel end assembly that is rotatable about a wheel axis that is disposed above the rotor axis, wherein the wheel end assembly includes a wheel hub that is adapted to facilitate mounting of a wheel; and an inboard transmission housing that has a first outer wall that abuts the motor housing and that extends around and partially receives the coolant jacket, the stator, and the rotor, a divider wall that extends from an end of the first outer wall toward the rotor axis, and a second outer wall that extends from the divider wall in an axial direction that extends away from the first outer wall, wherein the first outer wall and the second outer wall extend around the rotor axis and the wheel axis.

7. The axle assembly of claim 6 wherein the inboard transmission housing is positioned along the wheel axis between the motor housing and the wheel end assembly.

8. The axle assembly of claim 6 wherein the motor housing defines a first port that is fluidly connected to the coolant jacket and the inboard transmission housing defines a second port that is separated from the first port and is fluidly connected to the coolant jacket.

9. The axle assembly of claim 6 further comprising a transmission that transmits torque between the electric motor module and the wheel end assembly, wherein the transmission is received inside the inboard transmission housing.

10. The axle assembly of claim 9 wherein the transmission is partially encircled by the second outer wall.

11. The axle assembly of claim 9 wherein the divider wall is positioned between the electric motor module and the transmission.

12. The axle assembly of claim 9 wherein the first outer wall encircles the remaining members of the set of channels that are not received inside the motor housing.

13. The axle assembly of claim 9 wherein the divider wall has a pocket that is disposed along the wheel axis and that extends from a side of the divider wall that faces toward the transmission, wherein the pocket receives a bearing that rotatably supports an upper gear of the transmission that is rotatable about the wheel axis.

14. The axle assembly of claim 13 wherein the transmission includes a lower gear that meshes with the upper gear, is mounted to the rotor shaft, and is rotatable about the rotor axis.

15. The axle assembly of claim 6 wherein the end plate is axially positioned between the divider wall and the rotor, stator, and coolant jacket.

16. The axle assembly of claim 6 wherein the end plate is completely received inside the inboard transmission housing and/or is partially received inside the coolant jacket.

17. The axle assembly of claim 6 wherein the rotor shaft is rotatably supported by a second rotor bearing that extends from the divider wall and the end plate.

18. The axle assembly of claim 17 wherein the second rotor bearing is received inside a rotor shaft hole of the divider wall and inside a center hole of the end plate.

19. The axle assembly of claim 1 further comprising a wheel end assembly and an inboard transmission housing that has first outer wall that abuts the motor housing, a divider wall that extends from the first outer wall toward the rotor axis, and a second outer wall that extends from the divider wall, wherein the second outer wall is partially received inside a wheel that is mounted to the wheel end assembly.

20. A method of making an axle assembly comprising:

assembling an electric motor module by:

inserting a coolant jacket, a stator, a rotor, and a rotor shaft partially inside a motor housing, wherein the stator encircles the rotor, the coolant jacket encircles the stator, and the coolant jacket has a set of channels that are arranged around the stator;

attaching an end plate to an end of the coolant jacket that is disposed outside of the motor housing such that the rotor shaft extends through and is supported by the end plate;

installing the electric motor module on a transmission housing assembly by inserting a portion of the coolant jacket that is not partially received inside the motor housing into the transmission housing assembly; and fastening the motor housing to the transmission housing assembly, wherein the end plate is completely received inside the transmission housing assembly, multiple members of the set of channels are received inside the motor housing, and the remaining members of the set of channels are received inside the transmission housing assembly.

* * * * *